(12) United States Patent
Kikuchi et al.

(10) Patent No.: US 10,522,892 B2
(45) Date of Patent: Dec. 31, 2019

(54) HIGH-FREQUENCY LINE

(71) Applicant: NIPPON TELEGRAPH AND TELEPHONE CORPORATION, Tokyo (JP)

(72) Inventors: Nobuhiro Kikuchi, Atsugi (JP); Eiichi Yamada, Atsugi (JP); Yoshihiro Ogiso, Atsugi (JP); Josuke Ozaki, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 77 days.

(21) Appl. No.: 15/737,214

(22) PCT Filed: Jun. 24, 2016

(86) PCT No.: PCT/JP2016/003066
§ 371 (c)(1),
(2) Date: Dec. 15, 2017

(87) PCT Pub. No.: WO2016/208202
PCT Pub. Date: Dec. 29, 2016

(65) Prior Publication Data
US 2018/0175474 A1 Jun. 21, 2018

(30) Foreign Application Priority Data
Jun. 24, 2015 (JP) ................. 2015-126863

(51) Int. Cl.
*H01P 5/02* (2006.01)
*G02F 1/025* (2006.01)
(Continued)

(52) U.S. Cl.
CPC .............. *H01P 5/022* (2013.01); *G02F 1/025* (2013.01); *H01P 3/003* (2013.01); *H01P 3/081* (2013.01); *H01P 5/087* (2013.01)

(58) Field of Classification Search
CPC .......... H01P 3/081; H01P 3/003; H01P 5/087; H01P 5/022; G02F 1/025
(Continued)

(56) References Cited

FOREIGN PATENT DOCUMENTS

EP 0427092 A2 5/1991
JP 2007-334124 A 12/2007
(Continued)

OTHER PUBLICATIONS

Zhang et al. ("Improved performance of traveling wave directional coupler modulator based on electro-optic polymer", Optoelectronic Interconnects XII, edited by Alexei L. Glebov, Ray T. Chen, Proc. of SPIE vol. 8267, 82671 B, 2012, pp. 1-11) (Year: 2012).*

(Continued)

*Primary Examiner* — Benny T Lee
*Assistant Examiner* — Hafizur Rahman
(74) *Attorney, Agent, or Firm* — Workman Nydegger; Carl Reed

(57) ABSTRACT

This invention provides a high-frequency line adopting a structure to suppress an impedance variation and occurrence of an excessive power loss in high-frequency wiring having intersection with an optical waveguide. A high-frequency line is a microstrip line which has a basic configuration of stacking a ground electrode, a dielectric layer, and a signal electrode in this order on a SI-InP substrate. In addition, as shown in a transverse sectional view, an optical waveguide core made of InP-based semiconductor intersects with the high-frequency line in a crossing manner. A width of the signal electrode is partially increased in a certain region covering the intersection with the optical waveguide along a propagating direction of the high-frequency line. In the microstrip line, the width of the signal electrode is partially increased from $w_1$ to $w_2$, and characteristic impedance is thus reduced as compared to one with the uniform width $w_1$.

20 Claims, 29 Drawing Sheets

(51) Int. Cl.
   *H01P 5/08*   (2006.01)
   *H01P 3/00*   (2006.01)
   *H01P 3/08*   (2006.01)
(58) Field of Classification Search
   USPC .......................................................... 333/238
   See application file for complete search history.

(56) References Cited

FOREIGN PATENT DOCUMENTS

| JP | 2011-138425 A | 7/2011 |
|---|---|---|
| WO | WO 88/05556 A2 | 7/1988 |
| WO | WO2004/083952 | 9/2004 |
| WO | WO2006/107000 | 10/2006 |

OTHER PUBLICATIONS

Schmidt et al., "Directional Coupler Switches,' Modulators, and Filters Using Alternating Db Techniques", IEEE Transactions on Circuits and Systems, vol. CAS-26, No. 12, Dec. 1979, pp. 1099-1188 (Year: 1979).*

Datasheet of Arbitrary Waveform Generators, AWG70000A Series, Tektronix, Jul. 2, 2018, pp. 1-21 (Year: 2018).*
Hartley, Rick., "RF/Microwave PC Board Design and Layout" Jul. 2009, ECE 5250/4250 Microwave Circuit Design, Dr. Wickert's Info Center, University of Colorado, Colorado Springs, pp. 1-33 (Year: 2009).*
Zhang et al., "Highly Linear Broadband Optical Modulator Based on Electro-Optic Polymer", vol. 4, No. 6, Dec. 2012, pp. 2214-2228 (Year: 2012).*
Zhang, Xingyu,"Silicon—Polymer Hybrid Integrated Microwave Photonic Devices for Optical Interconnects and Electromagnetic Wave Detection", Ph.D. Thesis, The University of Texas, May 2015. , Chapter 7, pp. 143-176 (Year: 2015).*
EESR dated Jan. 16, 2019 in corresponding European Patent Application No. 16813974.9.
Nobuhiro Kikuchi et al., *80-Gb/s Low-Driving-Voltage InP DQPSK Modulator with an n-p-i-n Structure*, IEEE Photonics Technology Letters, vol. 21, No. 12, Jun. 15, 2009, pp. 787-789.
International Search Report dated Sep. 13, 2016, issued in PCT Application No. PCT/JP2016/003066, filed Jun. 24, 2016.
International Preliminary Report on Patentability dated Dec. 26, 2017, issued in PCT Application No. PCT/JP2016/003066, filed Jun. 24, 2016.

* cited by examiner

HIGH-FREQUENCY LINE

TECHNICAL FIELD

The present invention relates to a high-frequency line to apply an electric signal to a modulation electrode of an optical modulator or the like.

BACKGROUND ART

There has been a demand for capacity enlargement of an optical communication system along with an explosive increase in data communication traffic in recent years, and developments in integration and complication of optical components used therein as well as an increase in speed of signals are in progress. Examples of such optical components include optical modulators. A polarization multiplexing optical I/Q modulator in which two optical I/Q modulators (see Non Patent Literature 1, for example), each based on a Mach-Zehnder (MZ) modulator adaptable to multilevel modulation such as QPSK (quadrature phase shift keying) and 16QAM (16 quadrature amplitude modulation), are integrated for two polarized optical waves (a configuration including four Mach-Zehnder modulators integrated in total) has been increasingly used nowadays in order to enlarge a transmission capacity.

This polarization multiplexing optical I/Q modulator can generate an optical modulation signal in the order of 100 Gbits/s. However, in this process, it is necessary to input a high-speed electric signal at a symbol rate of several tens of gigahertz to each Mach-Zehnder modulator in the chip. Usually, a high-frequency signal inputted through an RF interface of a polarization multiplexing optical I/Q modulator module package is passed through a high-frequency wiring board in the module package and eventually supplied to the polarization multiplexing optical I/Q modulator chip. In order to suppress power loss and crosstalk in the above process, it is essential to minimize wiring for connection between the high-frequency wiring board and the polarization multiplexing optical I/Q modulator chip.

To this end, the RF interface of the polarization multiplexing optical I/Q modulator chip needs to be located at an end of the chip by appropriately laying out a high-frequency wiring in the chip. FIG. 1 shows a configuration of a polarization multiplexing optical I/Q modulator in which 50-ohm microstrip lines formed on a SI-InP substrate intersect with InP-based optical waveguides. As a consequence, each high-frequency line 103 connected to a modulation electrode 102 inevitably intersects with the optical waveguides 101 that propagate optical signals.

CITATION LIST

Non Patent Literature

NPL 1: Nobuhiro Kikuchi, et al., "80-Gb/s Low-Driving-Voltage InP DQPSK Modulator With an n-p-i-n Structure", IEEE PHOTONICS TECHNOLOGY LETTERS, Vol. 21, No. 12, Jun. 15, 2009.

SUMMARY OF INVENTION

Technical Problem

Now, effects of intersection of high-frequency wiring and optical waveguides on power loss and characteristic impedance will be described based on a result of simulating a situation where the high-frequency wiring intersects with the optical waveguides. FIGS. 2A and 2B illustrate models of a microstrip line not having intersection with optical waveguides and of a microstrip line having intersection with optical waveguides which are used in the simulation, respectively. In the simulation, a length of each line is set to 1.4 mm. Moreover, on the assumption that the polarization multiplexing optical I/Q modulator is formed from four Mach-Zehnder modulators, the line intersects with the optical waveguides 7 times at the maximum, and calculation is conducted by assigning 7 as the number of times of intersection. As for the simulation method, the 1.4-mm line is equally divided into seven 200-µm segments, each of which is then subjected to calculation in the case of not having the intersection with the optical waveguides and the case of having the intersection with the optical waveguides, and a result on the entire 1.4-mm line is calculated by multiplying the obtained results (a matrix).

FIGS. 3A and 3B show simulation results of power loss (S21 characteristic, 50-ohm) and characteristic impedance, respectively, in the presence and absence of the intersection of the microstrip line with the optical waveguides. The results show that the high-frequency wiring having the intersection with the optical waveguides exhibits an increase in insertion loss (S21) and a rise in characteristic impedance as compared to the high-frequency wiring not having the intersection.

As described above, the conventional high-frequency wiring in the polarization multiplexing optical I/Q modulator or the like has a problem of significant deterioration in the characteristics of the high-frequency line due to the intersection with the optical waveguides.

The present invention has been made in view of the aforementioned problem, and an object thereof is to provide a high-frequency line including a structure to suppress an impedance variation and occurrence of an excessive power loss in high-frequency wiring having intersection with an optical waveguide.

To solve the problem, the present invention provides a high-frequency line including a dielectric body, a signal electrode, and a ground electrode and configured to transmit a high-frequency electric signal, which is characterized in that when the high-frequency line is divided into segments each having a length shorter than a wavelength of the high-frequency electric signal, the signal electrode, the ground electrode, and the dielectric body in one of the segments having intersection of the high-frequency line with an optical waveguide are structured to have characteristic impedance equal to the characteristic impedance in another one of the segments not having the intersection of the high-frequency line with the optical waveguide.

Another aspect of the present invention is characterized in that the signal electrode in the segment having the intersection of the high-frequency line with the optical waveguide has two or more different widths.

Another aspect of the present invention is characterized in that the signal electrode in the segment having the intersection of the high-frequency line with the optical waveguide has two or more different thicknesses.

Another aspect of the present invention is characterized in that a gap between the signal electrode and the ground electrode in the segment having the intersection of the high-frequency line with the optical waveguide has two or more different distances.

Another aspect of the present invention is characterized in that the dielectric body in the segment having the intersection of the high-frequency line with the optical waveguide has two or more different dielectric constants.

Another aspect of the present invention is characterized in that the dielectric body in the segment having the intersection of the high-frequency line with the optical waveguide has two or more different thicknesses.

Another aspect of the present invention is characterized in that the high-frequency line is a microstrip line.

Another aspect of the present invention is characterized in that the high-frequency line is a coplanar line.

Another aspect of the present invention is characterized in that the high-frequency line is a grounded coplanar line.

Advantageous Effects of Invention

According to the present invention, it is possible to suppress an impedance variation and occurrence of an excessive power loss in high-frequency wiring having intersection with an optical waveguide.

DESCRIPTION OF EMBODIMENTS

Embodiments of the present invention will be described below in detail.

First Embodiment

Figure 1:
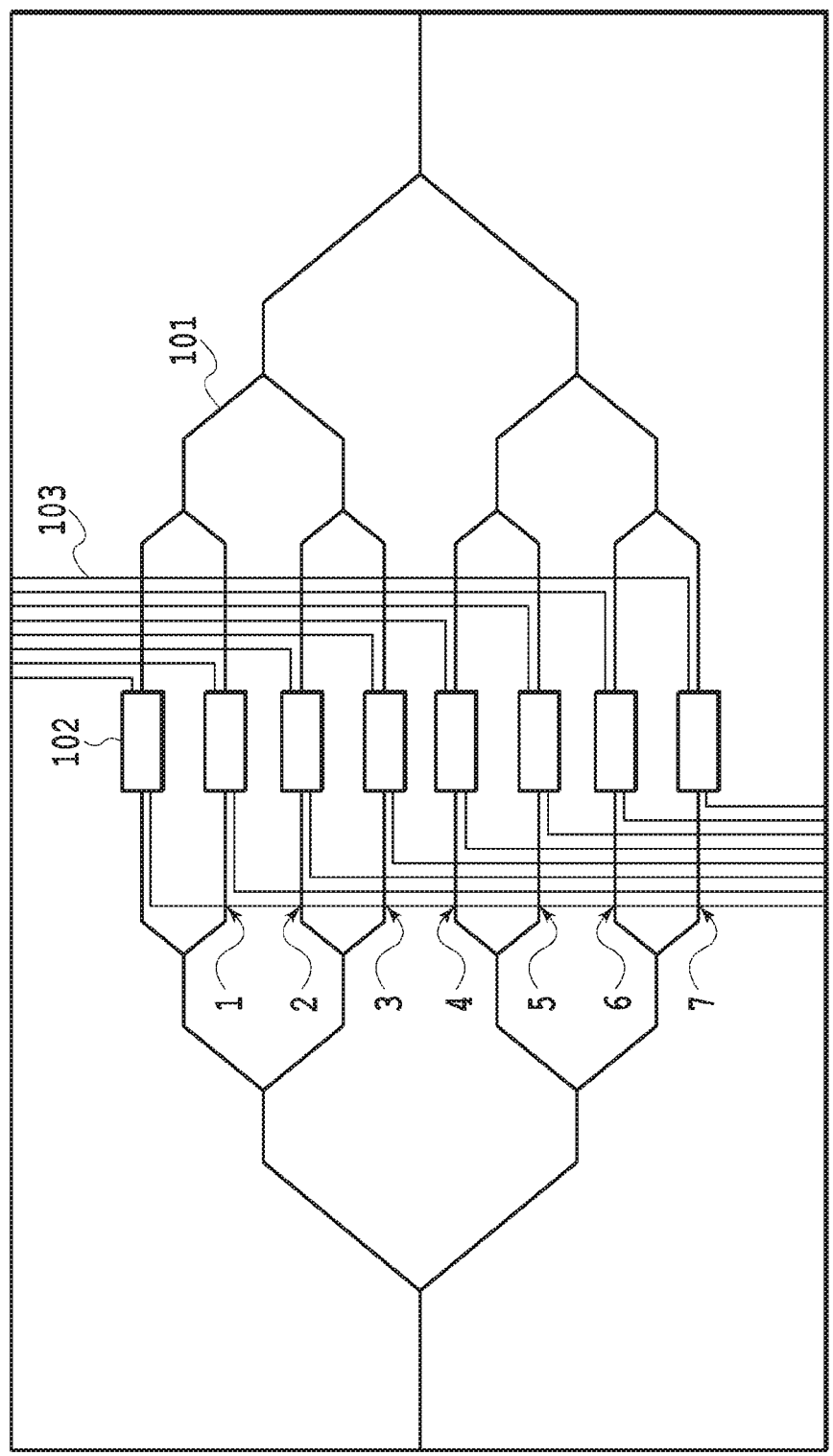
FIG. 1 is a diagram showing a configuration of a polarization multiplexing optical I/Q modulator including microstrip lines.
Figure 2A:
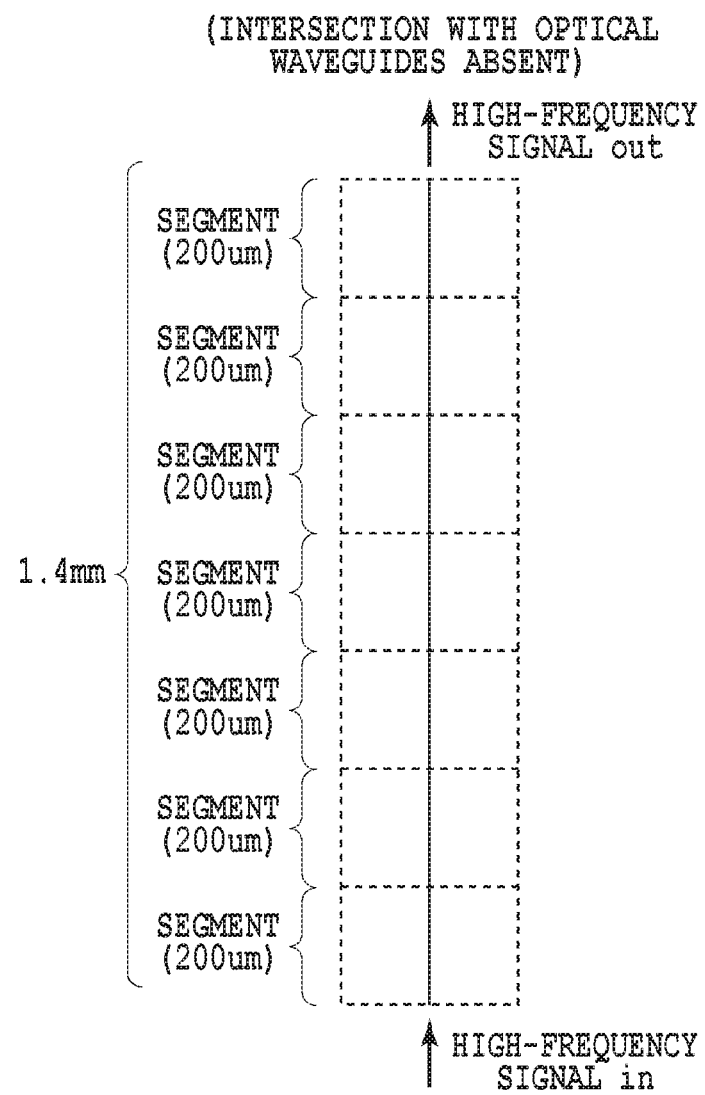
FIG. 2A is a diagram showing a model of a microstrip line not having intersection with optical waveguides, which is used in a simulation.
Figure 2B:
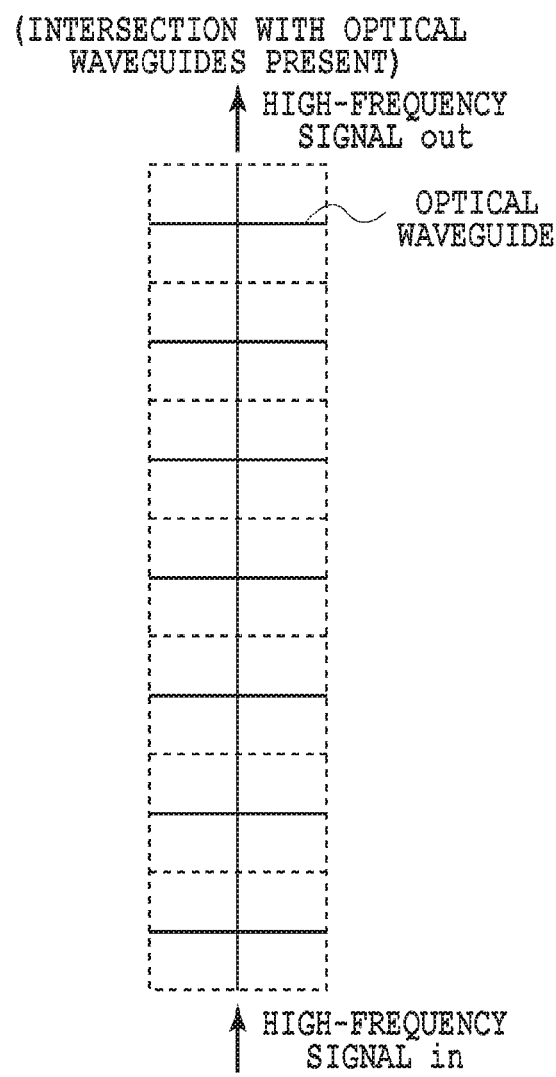
FIG. 2B is a diagram showing a model of a microstrip line having intersection with optical waveguides, which is used in the simulation.
Figure 3A:
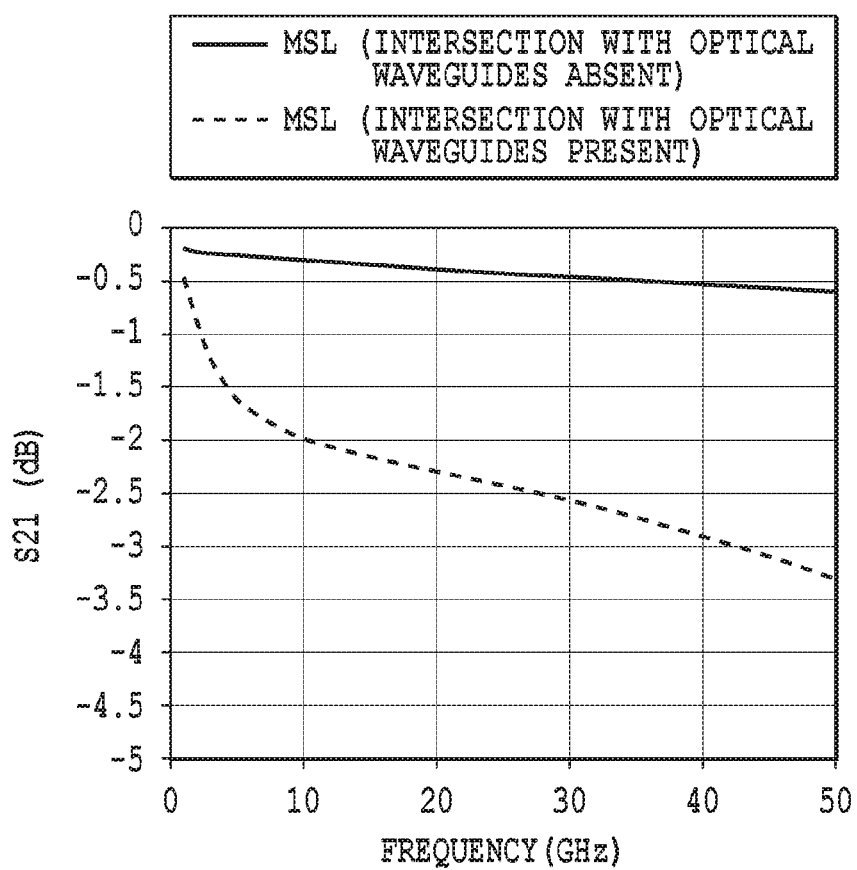
FIG. 3A is a diagram showing a simulation result of power loss (S21 characteristic, 50-ohm) in terms of the presence and absence of the intersection of the microstrip line with the optical waveguides, respectively.
Figure 3B:
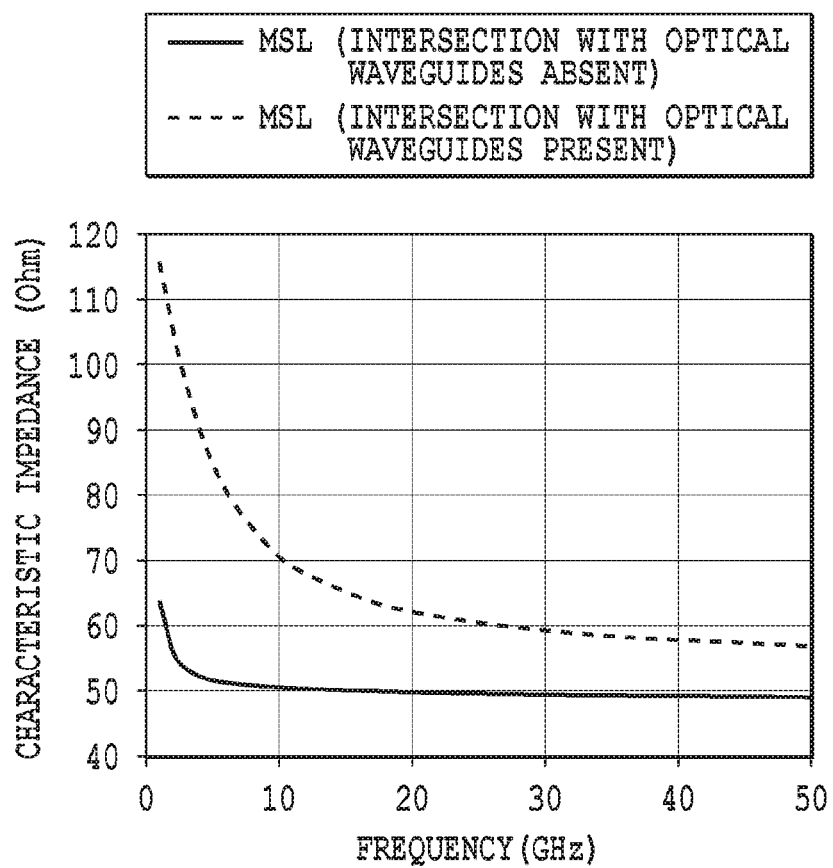
FIG. 3B is a diagram showing a simulation result of characteristic impedance in terms of the presence and absence of the intersection of the microstrip line with the optical waveguides, respectively.
Figure 4A:
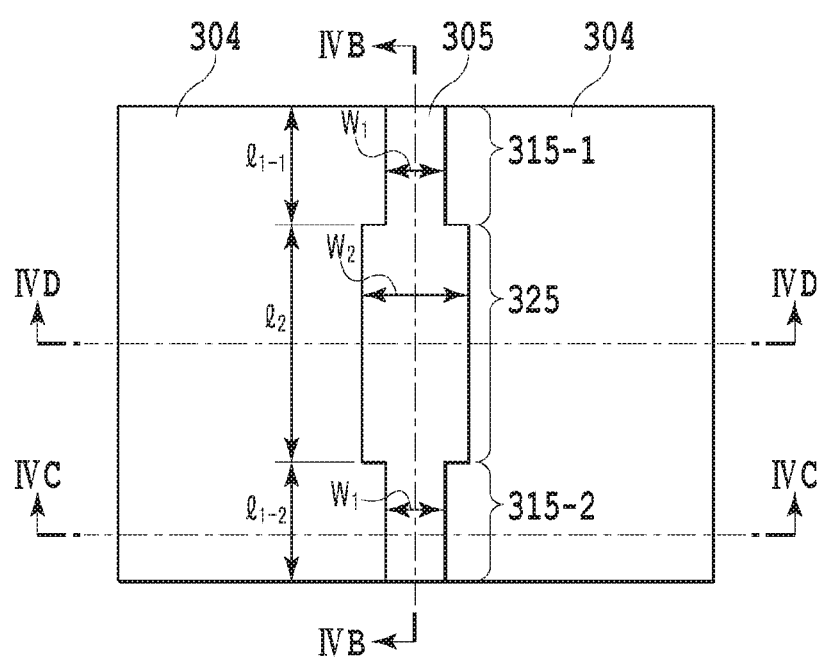
FIG. 4A is a top plan view of a high-frequency line according to a first embodiment of the present invention.
Figure 4B:
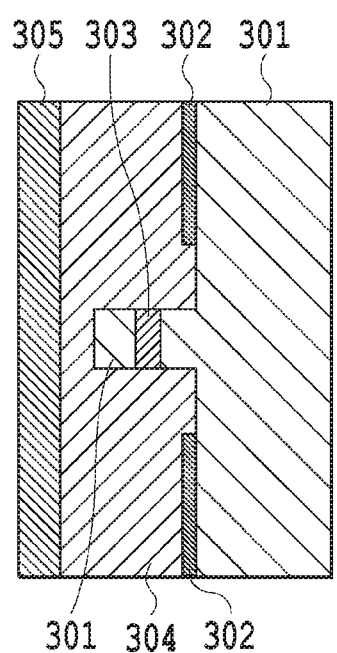
FIG. 4B is a cross-sectional view of the high-frequency line according to the first embodiment of the present invention, which is taken along the IVB-IVB line in FIG. 4A.
Figure 4C:
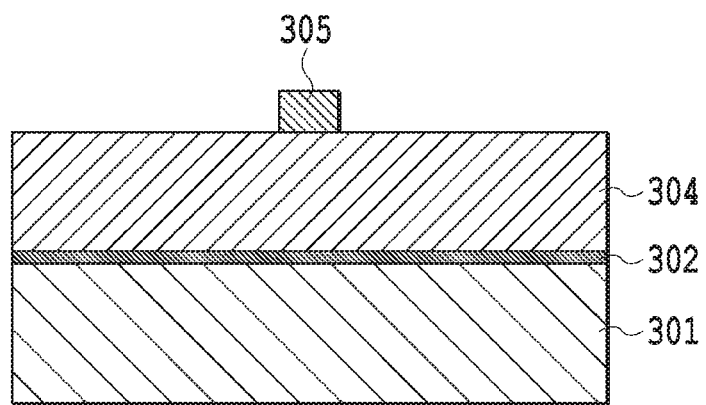
FIG. 4C is a transverse sectional view of the high-frequency line according to the first embodiment of the present invention, which is taken along the IVC-IVC line in FIG. 4A.
Figure 4D:
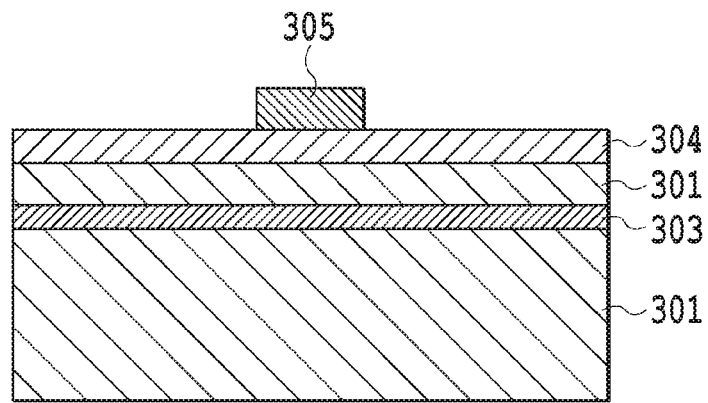
FIG. 4D is a transverse sectional view of the high-frequency line according to the first embodiment of the present invention, which is taken along the IVD-IVD line in FIG. 4A.

FIG. 4A shows a top plan view of a segment unit of a high-frequency line according to a first embodiment of the present invention, FIG. 4B shows a cross-sectional view thereof taken along the IVB-IVB line, FIG. 4C shows a transverse sectional view thereof taken along the IVC-IVC line, and FIG. 4D shows a transverse sectional view thereof taken along the IVD-IVD line, respectively. The high-frequency line of this embodiment is a microstrip line and has a basic configuration in which a ground electrode 302, a dielectric layer 304, and a signal electrode 305 are sequentially stacked on a SI-InP substrate 301. In addition, as shown in the transverse sectional view, an optical waveguide core 303 made of InP-based semiconductor intersects with the high-frequency line in a crossing manner.

The presence of the intersection with the optical waveguide causes partial disconnection of the ground electrode 302 of the high-frequency line along a propagating direction, and part of the dielectric layer 304 is replaced with an InP-based material as shown in the cross-sectional view of FIG. 4B and the transverse sectional view of FIG. 4D. As a consequence, a dielectric constant between the ground electrode 302 and the signal electrode 305 is partially changed. This means that characteristic impedance of the high-frequency line varies in a region of intersection with the optical waveguide, and an excessive loss of power is induced in the case of a conventional structure in which the signal electrode is uniform in the propagating direction.

As mentioned above, in the case of having the intersection with the optical waveguides while not including a compensation structure (in a uniform structure in the propagating direction), the S21 characteristic is deteriorated (the power loss is increased) and the characteristic impedance rises significantly as compared to the case of not having the intersection with the optical waveguides. Deviation of the characteristic impedance from a designed value causes reflection of an electric signal whereby the characteristic is deteriorated.

Accordingly, in this embodiment, the width of the signal electrode 305 is partially increased in a certain region covering the intersection with the optical waveguides along the propagating direction of the high-frequency line, and based on each segment obtained by equally dividing the high-frequency line as shown in FIGS. 4A to 4D. In the microstrip line, an increase in width of the signal electrode 305 partially from w1 to w2 brings about an effect to reduce the characteristic impedance as compared to the one with the uniform width w1.

The length (l1−1+l2+l1−2) of each segment is set to a sufficiently shorter length (about 1/10 or below in general) than a wavelength of a high-frequency electric signal to be inputted. Thus, the entire characteristic impedance including front and back portions of the high-frequency line can be regarded as the characteristic impedance obtained by adding up respective characteristic impedances according to the ratios of a length of a second signal electrode portion 325 having the width w2 to a length of a first signal electrode portions 315 located at the front and back thereof and having the width w1, and then averaging the added value. Accordingly, the electrode width w2 of the second signal electrode portion 325 may be set depending on the desired characteristic impedance and an allowable length l2 of the second signal electrode portion 325.

Figure 5A:
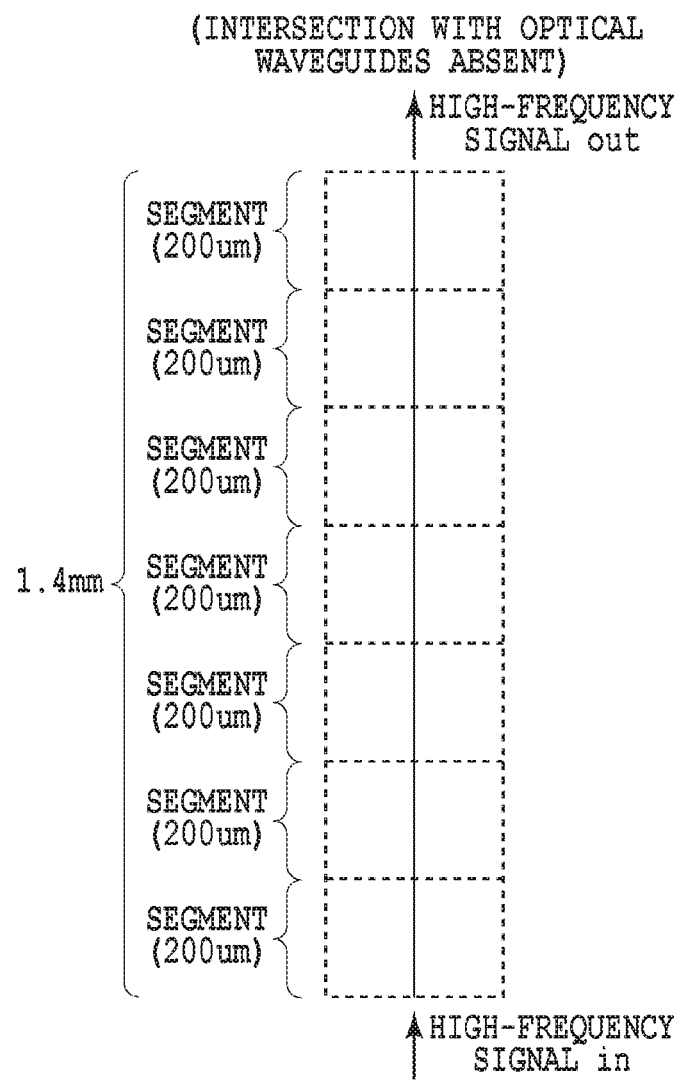
FIG. 5A is a diagram showing a model of a microstrip line not having intersection with optical waveguides, which is used in a simulation.
Figure 5B:
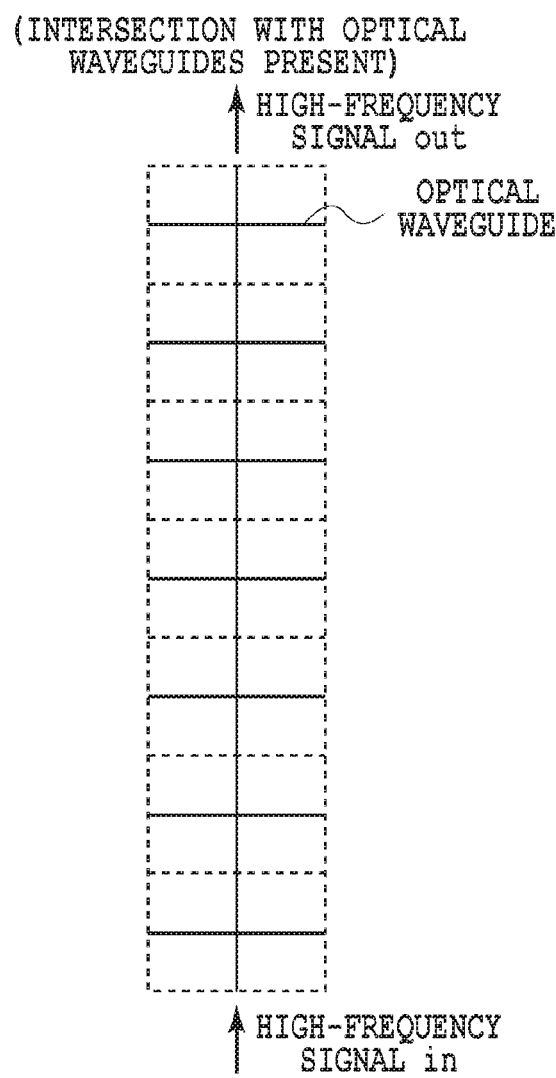
FIG. 5B is a diagram showing a model of a microstrip line having intersection with optical waveguides, which is used in the simulation.
Figure 5C:
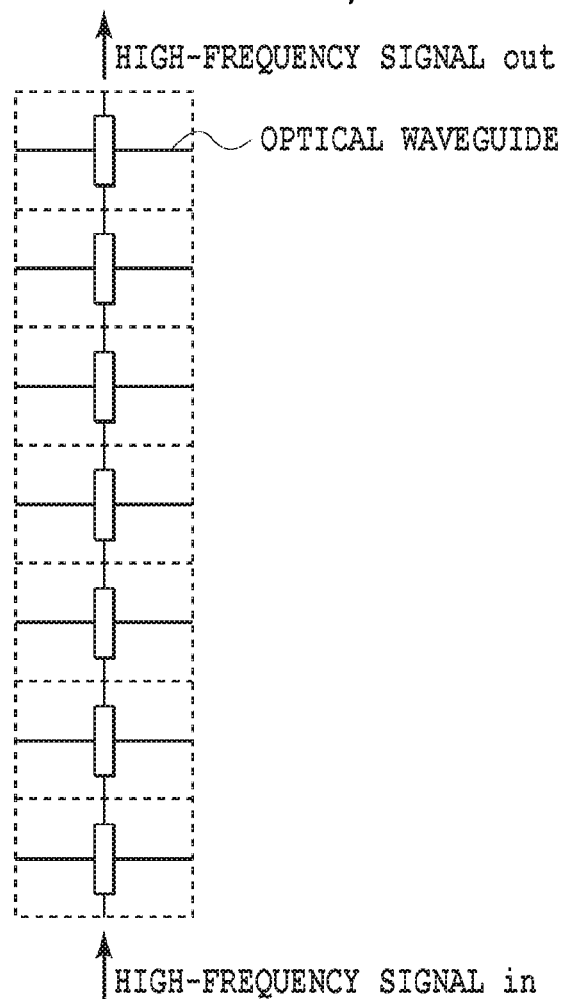
FIG. 5C is a diagram showing a model of a microstrip line having intersection with optical waveguides and including a compensation structure using second signal electrode portions 325, which is used in the simulation.
Figure 6A:
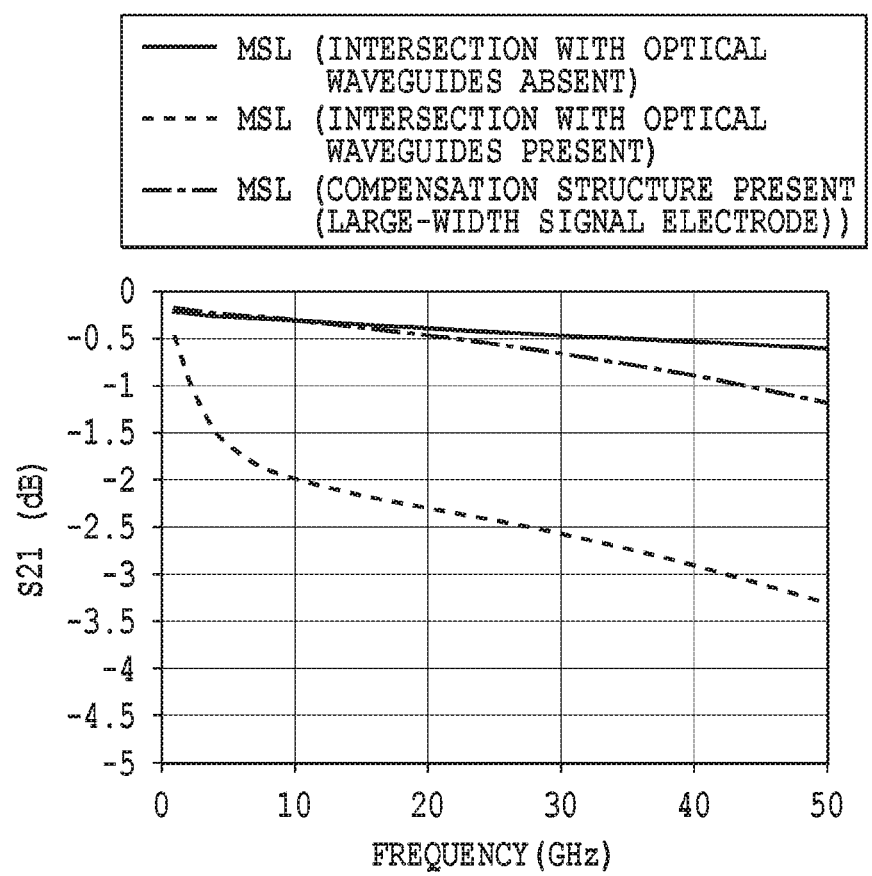
FIG. 6A is a diagram showing simulation results of power loss (S21 characteristic, 50-ohm) in the case of not having the intersection of the microstrip line with the optical waveguides, in the case of having the intersection of the microstrip line with the optical waveguides, and in the case of having the intersection with the optical waveguides and including the compensation structure using the second signal electrode portions 325.
Figure 6B:
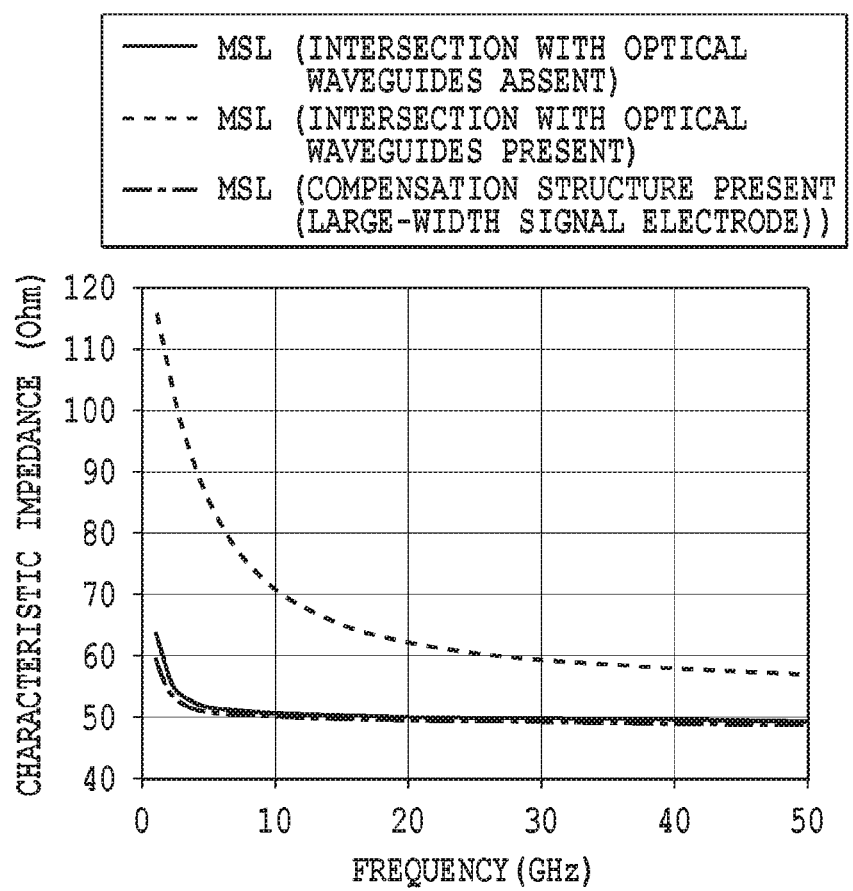
FIG. 6B is a diagram showing simulation results of characteristic impedance in the case of not having the intersection of the microstrip line with the optical waveguides, in the case of having the intersection of the microstrip line with the optical waveguides, and in the case of having the intersection with the optical waveguides and including the compensation structure using the second signal electrode portions 325.

FIGS. 5A to 5C show models of the microstrip line not having the intersection with the optical waveguides, the microstrip line having the intersection with the optical waveguides, and the microstrip line having the intersection with the optical waveguides and including a compensation structure using the second signal electrode portions 325, respectively, which are used in the simulation. In the meantime, FIGS. 6A and 6B show simulation results concerning power loss (S21 characteristic, 50-ohm) and characteristic impedance in the case of not having the intersection of the microstrip line with the optical waveguides, in the case of having the intersection of the microstrip line with the optical waveguides, and in the case of having the intersection with the optical waveguides and including the compensation structure using the second signal electrode portions 325. Effects of suppressing a rise in power loss (S21) and a rise in characteristic impedance due to the intersection with the optical waveguides, the effects being attributed to the presence of the compensation structure using the second signal electrode portions 325, can be confirmed from FIGS. 6A and 6B.

This embodiment shows an example of increasing the width w2 of each second signal electrode portion 325 of the signal electrode 305 of the microstrip line, the second signal electrode portion 325 covering the region intersecting with the optical waveguide. Nonetheless, what is required here is to obtain the desired characteristic impedance on average in a certain region such as a segment of 200 μm. In this context, the width w1 of the signal electrodes of the first signal electrode portions 315 at the front and back of the region intersecting with the optical waveguide may be set larger than the width w2 of the second signal electrode portion 325 instead.

Second Embodiment

Figure 7A:
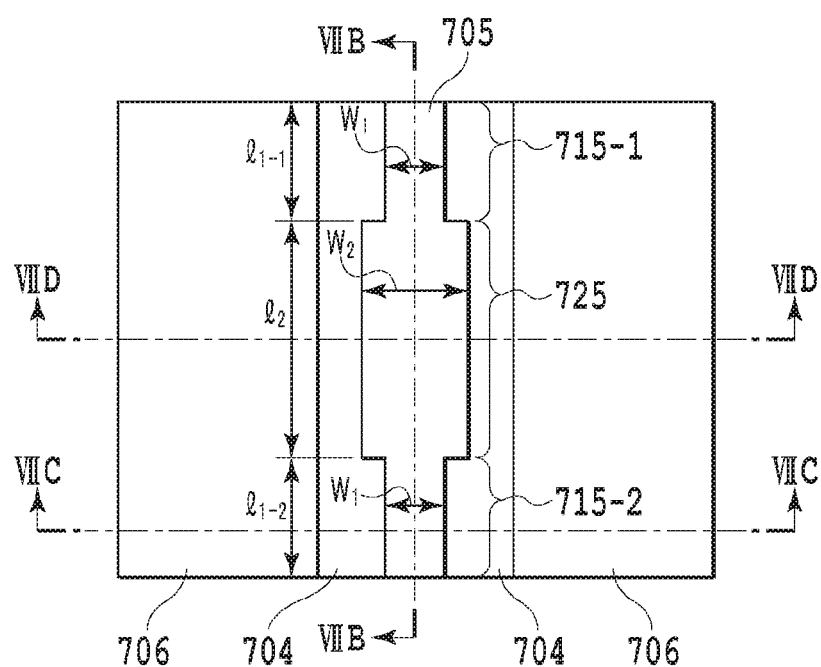
FIG. 7A is a top plan view of a high-frequency line according to a second embodiment of the present invention.
Figure 7B:
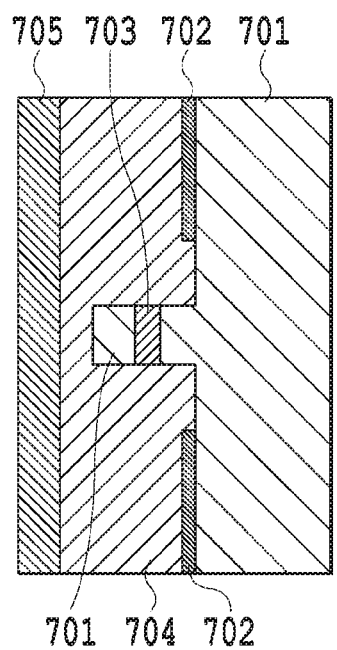
FIG. 7B is a cross-sectional view of the high-frequency line according to the second embodiment of the present invention, which is taken along the VIIB-VIIB line in FIG. 7A.
Figure 7C:
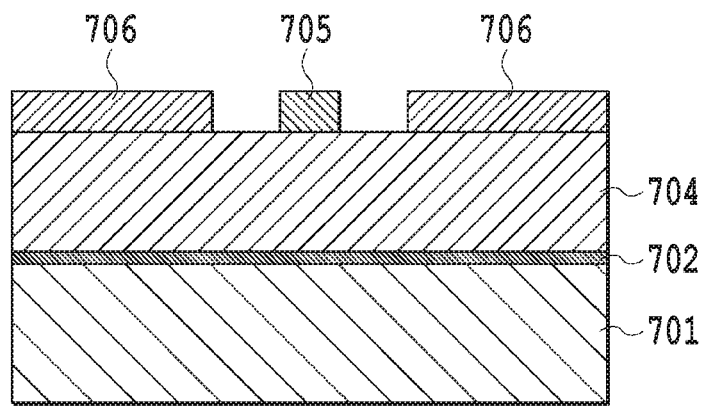
FIG. 7C is a transverse sectional view of the high-frequency line according to the second embodiment of the present invention, which is taken along the VIIC-VIIC line in FIG. 7A.
Figure 7D:
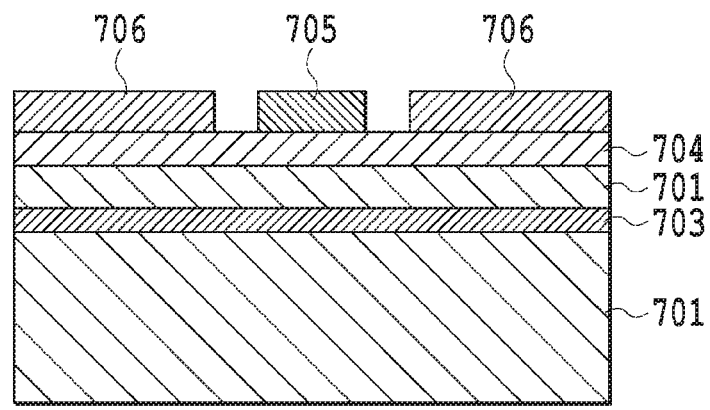
FIG. 7D is a transverse sectional view of the high-frequency line according to the second embodiment of the present invention, which is taken along the VIID-VIID line in FIG. 7A.

FIG. 7A shows a top plan view of a segment unit of a high-frequency line according to a second embodiment of the present invention, FIG. 7B shows a cross-sectional view thereof taken along the VIIB-VIIB line, FIG. 7C shows a transverse sectional view thereof taken along the VIIC-VIIC line, and FIG. 7D shows a transverse sectional view thereof taken along the VIID-VIID line, respectively. The high-frequency line of this embodiment is a grounded coplanar line and has a basic configuration in which a lower-layer ground electrode 702, a dielectric layer 704, a signal electrode 705, and an upper-layer ground electrode 706 are sequentially stacked on a SI-InP substrate 701. In addition, as shown in the transverse sectional view, an optical waveguide core 703 made of InP-based semiconductor intersects with the high-frequency line in a crossing manner.

The presence of the intersection with the optical waveguide causes a partial change in dielectric constant between the lower-layer ground electrode 702 and the signal electrode 705 as described in the first embodiment. This means that the characteristic impedance of the high-frequency line varies in the region of intersection with the optical waveguide, and an excessive loss of power is induced in the case of the conventional structure in which the signal electrode is uniform in the propagating direction.

Figure 8A:
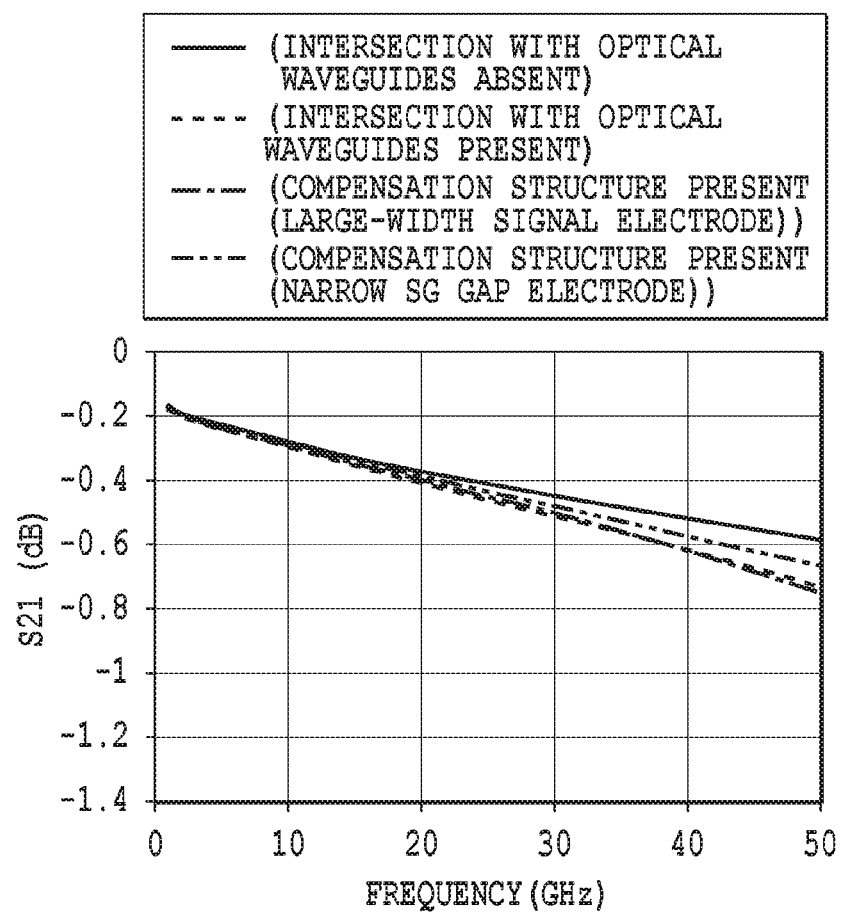
FIG. 8A is a diagram showing an example of simulating a difference in characteristic concerning the power loss (the S21 characteristic) of a grounded coplanar line designed for 50Ω and depending on the presence and absence of the intersection with the optical waveguides.
Figure 8B:
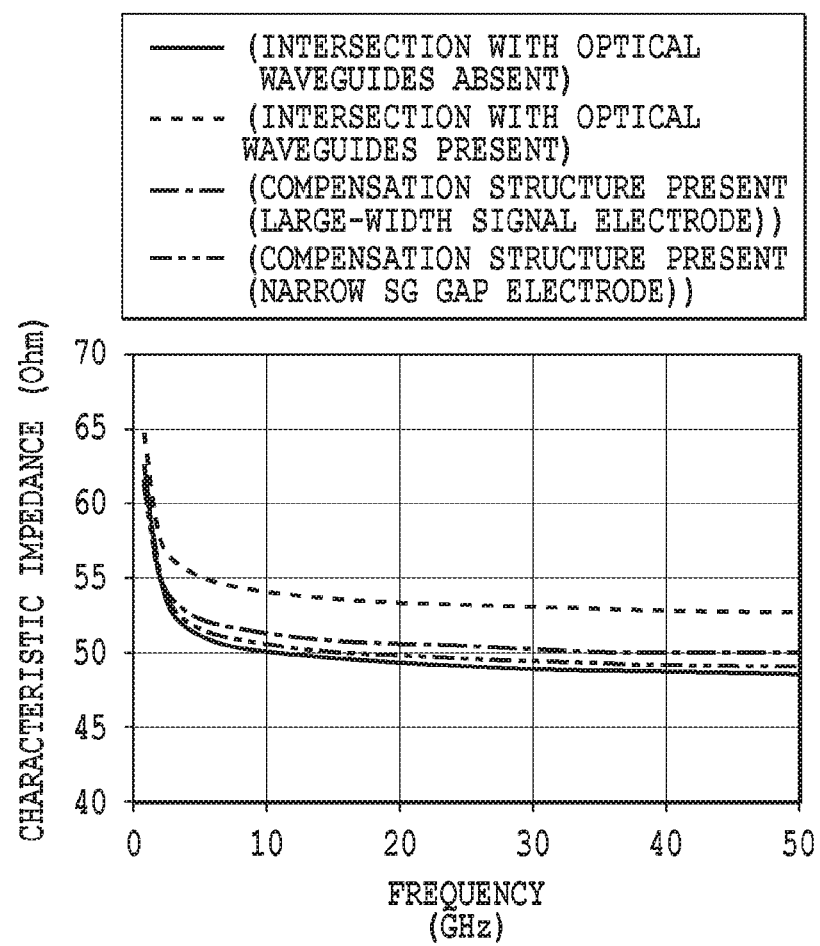
FIG. 8B is a diagram showing an example of simulating a difference in characteristic concerning the characteristic impedance of the grounded coplanar line designed for 50Ω and depending on the presence and absence of the intersection with the optical waveguides.

FIGS. 8A and 8B show an example of simulating differences in characteristic concerning the power loss (the S21 characteristic) and the characteristic impedance of a grounded coplanar line designed for 50Ω and depending on the presence and absence of the intersection with the optical waveguides. In the calculation, as with the first embodiment, the calculation is conducted by setting the length of the line to 1.4 mm and setting the number of times of intersection to seven times in the case of having the intersection.

As shown in FIGS. 8A and 8B, in the case of having the intersection with the optical waveguides while not including a compensation structure, it is confirmed that the S21 characteristic is deteriorated (the power loss is increased) and the characteristic impedance rises as compared to the case of not having the intersection with the optical waveguides.

Accordingly, in this embodiment, the width of the signal electrode 705 is partially increased in a certain region covering the intersection with the optical waveguides along the propagating direction of the high-frequency line, and based on each segment obtained by equally dividing the high-frequency line as shown in FIGS. 7A to 7D. In the grounded coplanar line, an increase in width of the signal electrode 705 partially from w1 to w2 brings about an effect to reduce the characteristic impedance as compared to the one with the uniform width w1.

The length (l1−1+l2+l1−2) of the segment is set to a sufficiently shorter length than a wavelength of a high-frequency electric signal to be inputted (about ⅒ or below in general). Thus, the entire characteristic impedance including front and back portions of the high-frequency line can be regarded as the characteristic impedance obtained by adding up respective characteristic impedances according to the ratios of a length of a second signal electrode portion 725 having the width w2 to a length of a first signal electrode portions 715 located at the front and back thereof and having the width w1, and then averaging the added value. Accordingly, the electrode width w2 of the second signal electrode portion 725 may be set depending on the desired characteristic impedance and an allowable length l2 of the second signal electrode portion 725.

In the case with the compensation structure (a large-width signal electrode) using the second signal electrode portion 725 having the width w2, an effect to suppress a rise in characteristic impedance is confirmed in particular as shown in FIG. 8B.

This embodiment shows an example of increasing the width w2 of each second signal electrode portion 725 of the signal electrode 705 of the grounded coplanar line, the second signal electrode portion 725 covering the region intersecting with the optical waveguide. Nonetheless, what is required here is to obtain the desired characteristic impedance on average in a certain region such as a segment of 200 μm. In this context, the width w1 of the signal electrodes of the signal electrode portions 715 at the front and back of the region intersecting with the optical waveguide may be set larger than the width w2 of the second signal electrode portion 725 instead.

Third Embodiment

Figure 9A:
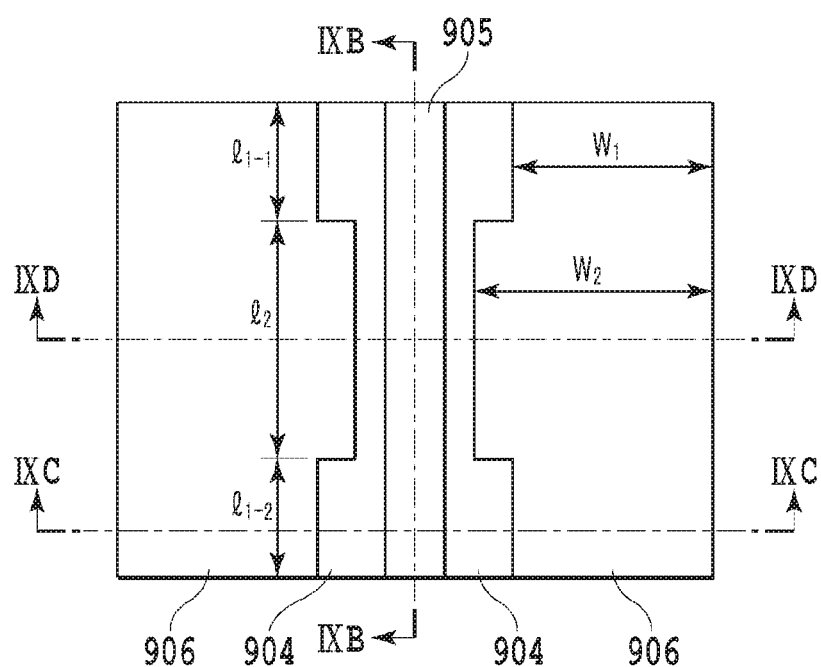
FIG. 9A is a top plan view of a different grounded coplanar line according to a third embodiment of the present invention.
Figure 9B:
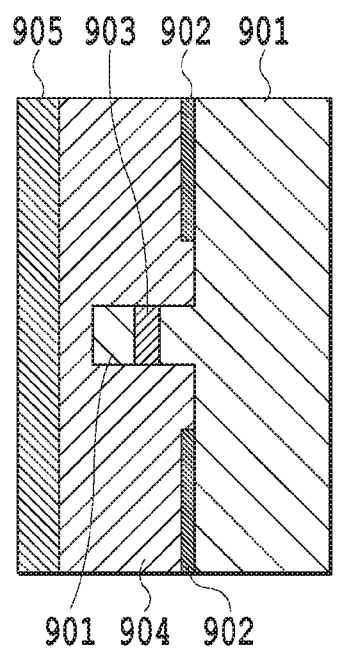
FIG. 9B is a cross-sectional view of the different grounded coplanar line according to the third embodiment of the present invention, which is taken along the IXB-IXB line in FIG. 9A.
Figure 9C:
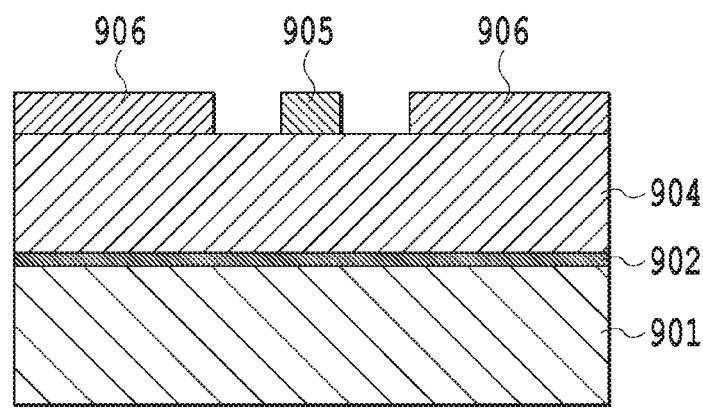
FIG. 9C is a transverse sectional view of the different grounded coplanar line according to the third embodiment of the present invention, which is taken along the IXC-IXC line in FIG. 9A.
Figure 9D:
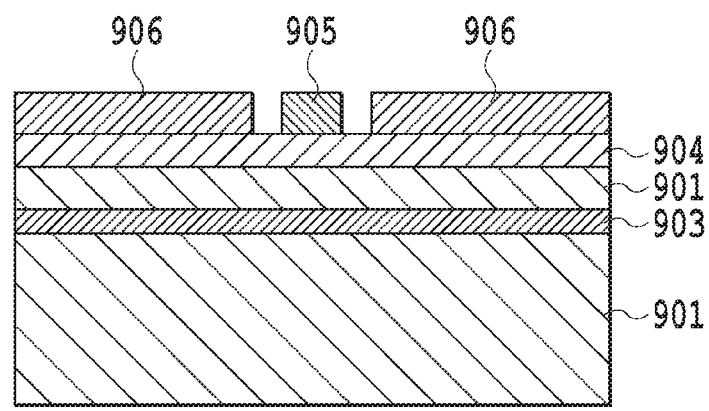
FIG. 9D is a transverse sectional view of the different grounded coplanar line according to the third embodiment of the present invention, which is taken along the IXD-IXD line in FIG. 9A.

Furthermore, FIG. 9A shows a top plan view of a grounded coplanar line according to a third embodiment of the present invention, FIG. 9B shows a cross-sectional view thereof taken along the IXB-IXB line, FIG. 9C shows a transverse sectional view thereof taken along the IXC-IXC line, and FIG. 9D shows a transverse sectional view thereof taken along the IXD-IXD line, respectively. A signal electrode width 905 may be set uniform, and meanwhile, a width of each upper-layer ground electrode 906 may be increased in a region intersecting with an optical waveguide, and a gap between the signal electrode 905 and each upper-layer ground electrode 906 may be changed, or more specifically, narrowed as shown in FIG. 9A. In this case of having the compensation structure (a narrow SG gap electrode), an effect to suppress a rise in characteristic impedance and an effect to suppress an increase in excessive power loss are confirmed as shown in FIG. 8B.

Fourth Embodiment

Figure 10A:
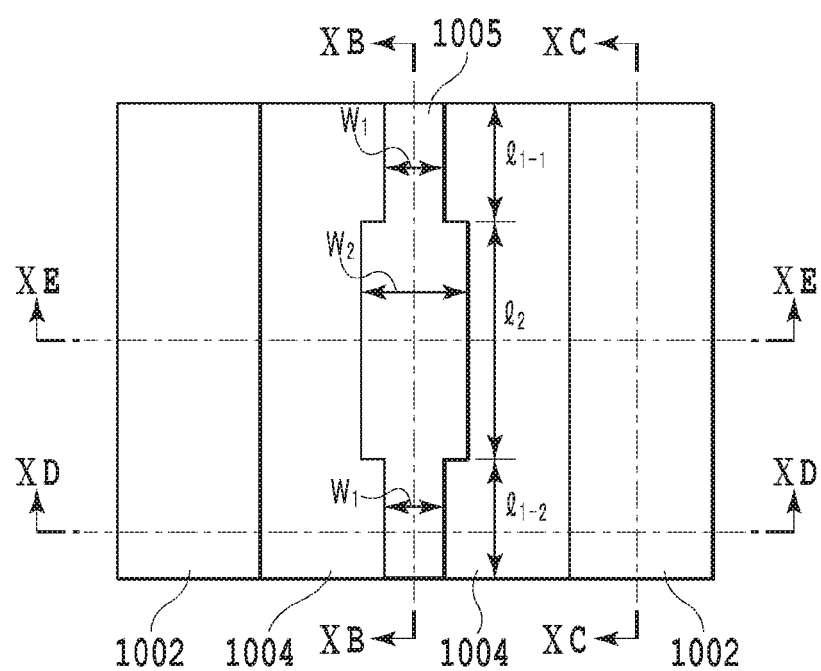
FIG. 10A is a top plan view of an eclectic structure of a different microstrip line and a grounded coplanar line according to a fourth embodiment of the present invention.
Figure 10B:
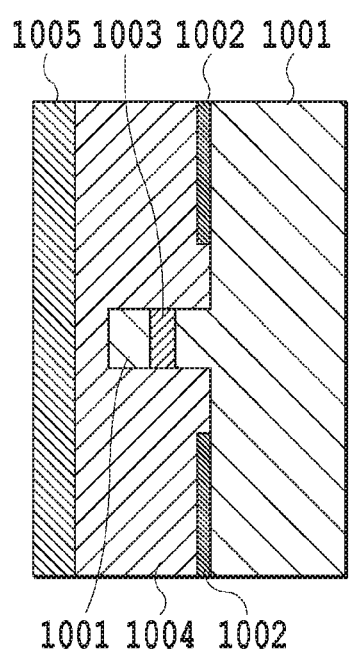
FIG. 10B is a cross-sectional view of the eclectic structure of the different microstrip line and the grounded coplanar line according to the fourth embodiment of the present invention, which is taken along the XB-XB line in FIG. 10A.
Figure 10C:
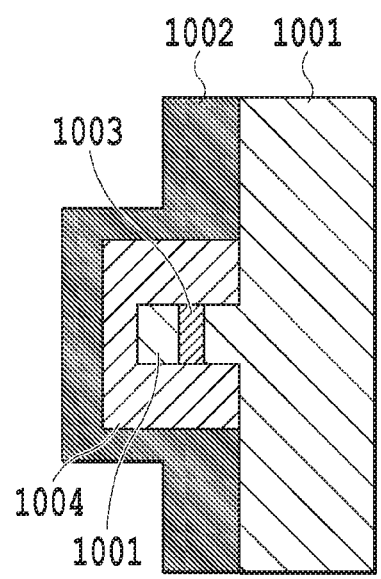
FIG. 10C is a cross-sectional view of the eclectic structure of the different microstrip line and the grounded coplanar line according to the fourth embodiment of the present invention, which is taken along the XC-XC line in FIG. 10A.
Figure 10D:
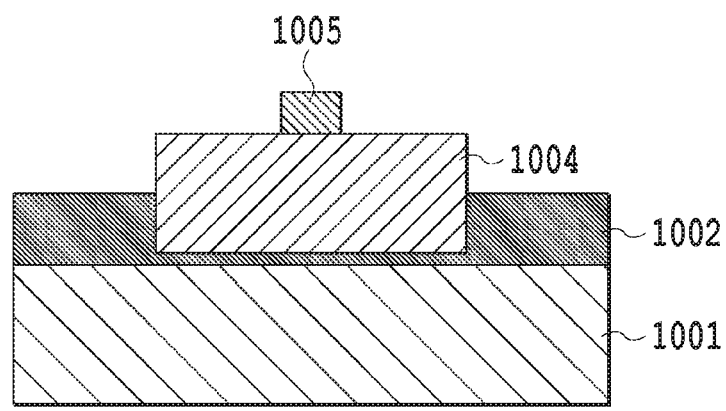
FIG. 10D is a transverse sectional view of the eclectic structure of the different microstrip line and the grounded coplanar line according to the fourth embodiment of the present invention, which is taken along the XD-XD line in FIG. 10A.
Figure 10E:
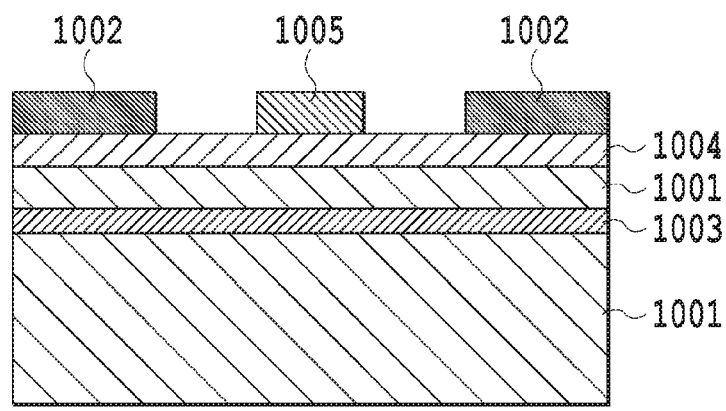
FIG. 10E is a transverse sectional view of the eclectic structure of the different microstrip line and the grounded coplanar line according to the fourth embodiment of the present invention, which is taken along the XE-XE line in FIG. 10A.

FIG. 10A shows a top plan view of an eclectic structure of a microstrip line and a grounded coplanar line according to a fourth embodiment of the present invention, FIG. 10B shows a cross-sectional view thereof taken along the XB-XB line, FIG. 10C shows a cross-sectional view thereof taken along the XC-XC line, FIG. 10D shows a transverse sectional view thereof taken along the XD-XD line, and FIG. 10E shows a transverse sectional view thereof taken along the XE-XE line, respectively. This structure provides a ground electrode 1002 in a region intersecting with the optical waveguide as shown in FIG. 10E, which is located at the same position as any of the upper-layer ground electrodes 706 and 906 of the grounded coplanar lines, and provides the ground electrode 1002 only on a SI-InP substrate 1001 like a microstrip line as shown in FIG. 10D at portions at the front and back of the region intersecting with the optical waveguide. Regarding the high-frequency line shown in FIGS. 10A to 10E as well, it is possible to suppress a rise in characteristic impedance and an increase in excessive power loss by providing a signal electrode 1005 with the compensation structure as with the first and second embodiments.

Note that the first to fourth embodiments show the examples of providing any of the signal electrode and the ground electrode with the compensation structure. Instead, other compensation structures may be used while changing a thickness of any of the electrodes, a gap between the signal electrode and the ground electrode, a dielectric constant and/or a thickness of the dielectric layer, which represent parameters that can change the characteristic impedance.

In the meantime, while the first to fourth embodiment show the examples of the high-frequency lines each of which consists of either the structure of the microstrip line, the structure of the grounded coplanar line or the eclectic structure of them, the basic structure of the high-frequency line may of course be changed in the middle. In addition, while the signal electrode and the ground electrode are formed to be attached onto the dielectric body, those electrodes may partially be formed into air-bridge structure.

As described above, it is possible to suppress a variation in impedance or occurrence of an excessive power loss by partially changing the structure of the high-frequency line depending on the intersection with the optical waveguide.

REFERENCE SIGNS LIST

101 optical waveguide
102 modulation electrode
103 high-frequency line
301, 701, 901, 1001 SI-InP substrate
302, 702, 706, 902, 1002 ground electrode 303, 703, 903, 1003 optical waveguide core
304, 704, 904, 1004 dielectric layer
305, 705, 905, 1005 signal electrode

The invention claimed is:

1. A high-frequency line including a dielectric body, a signal electrode, and a ground electrode and configured to transmit a high-frequency electric signal, wherein
when the high-frequency line is divided into segments each having a length shorter than a wavelength of the high-frequency electric signal, one of the segments includes a first region that intersects with an optical waveguide in a crossing manner and a second region that does not intersect with the optical waveguide in the crossing manner, wherein the first region and the second region are structured to have an entire characteristic impedance in the segment that includes the first region and the second region equal to a characteristic impedance in another one of the segments that does not intersect with the optical waveguide in a crossing manner.

2. The high-frequency line according to claim 1, wherein the signal electrode in the segment has a first width in the first region and a second width in the second region.

3. The high-frequency line according to claim 2 is a microstrip line.

4. The high-frequency line according to claim 2 is a coplanar line.

5. The high-frequency line according to claim 2 is a grounded coplanar line.

6. The high-frequency line according to claim 1, wherein the dielectric body has a first thickness in the first region and a second thickness in the second region.

7. The high-frequency line according to claim 1 is a microstrip line.

8. The high-frequency line according to claim 1 is a coplanar line.

9. The high-frequency line according to claim 1 is a grounded coplanar line.

10. The high-frequency line according to claim 1, wherein the signal electrode has a first thickness in the first region and a second thickness in the second region.

11. The high-frequency line according to claim 10 is a grounded coplanar line.

12. The high-frequency line according to claim 10 is a coplanar line.

13. The high-frequency line according to claim 10 is a microstrip line.

14. The high-frequency line according to claim 1, wherein a gap between the signal electrode and the ground electrode in the segment has a first distance in the first region and a second distance in the second region.

15. The high-frequency line according to claim 14 is a grounded coplanar line.

16. The high-frequency line according to claim 14 is a microstrip line.

17. The high-frequency line according to claim 14 is a coplanar line.

18. The high-frequency line according to claim 1, wherein the dielectric body in the segment has a first dielectric constant in the first region and a second dielectric constant in the second region.

19. The high-frequency line according to claim 18 is a microstrip line.

20. The high-frequency line according to claim 18 is a coplanar line.

* * * * *